United States Patent [19]

Beckett

[11] Patent Number: 4,887,088

[45] Date of Patent: Dec. 12, 1989

[54] SIGNAL PROCESSING AND RADIO RANGING SYSTEM

[75] Inventor: Andrew R. Beckett, Stevenage, England

[73] Assignee: British Aerospace Public Limited Company, London, England

[21] Appl. No.: 275,596

[22] Filed: Nov. 23, 1988

Related U.S. Application Data

[63] Continuation of Ser. No. 20,198, Feb. 27, 1987, abandoned, which is a continuation of Ser. No. 786,527, Oct. 11, 1985, abandoned.

[30] Foreign Application Priority Data

Oct. 12, 1984 [GB] United Kingdom ............... 8425874

[51] Int. Cl.$^4$ ............................................. G01S 13/26
[52] U.S. Cl. ..................................... 342/128; 342/61; 342/159; 342/196
[58] Field of Search ................ 342/128, 145, 61, 134, 342/129-132, 192, 194-196

[56] References Cited

U.S. PATENT DOCUMENTS

| Re. 31,509 | 1/1984 | Neidell | 342/108 |
|---|---|---|---|
| 3,889,261 | 6/1975 | Sirven | 343/14 |
| 4,028,700 | 6/1977 | Carey et al. | 342/127 |
| 4,042,925 | 8/1977 | Albanese et al. | 342/132 |
| 4,079,377 | 3/1978 | zur Heiden et al. | 342/127 |
| 4,176,351 | 11/1979 | DeVita et al. | 342/127 |
| 4,232,315 | 11/1980 | Kern | 342/134 X |
| 4,388,622 | 6/1983 | Fletcher, Jr. | 342/129 X |
| 4,450,444 | 5/1984 | Wehner et al. | 342/196 X |
| 4,536,763 | 8/1985 | von Pieverling | 342/127 |
| 4,567,484 | 1/1986 | Schilz et al. | 342/127 |
| 4,620,192 | 10/1986 | Collins | 342/128 |
| 4,637,941 | 6/1987 | Van Der Mark | 342/128 |
| 4,639,733 | 1/1987 | King et al. | 342/424 |
| 4,665,401 | 5/1987 | Garrard et al. | 342/75 |

Primary Examiner—Thomas H. Tarcza
Assistant Examiner—John B. Sotomayor
Attorney, Agent, or Firm—Cushman, Darby & Cushman

[57] ABSTRACT

A radio slant ranging system having a bank of range gates producing outputs $X_I$ to $X_N$ which comprise ground clutter components on a thermal noise pedestal. The clutter components are regarded as defining a single sinusoidal ripple envelope on the noise pedestal and a clutter centroid tracking signal is derived by using a digital filter to calculate the real and imaginary components $A_{1R}$ and $A_{1I}$ of the transform:

$$A_1 = \sum_{n=1}^{N} X_n \cdot e^{-j2\pi(n-1)/N}$$

and then forming the arctangent of $A_{1I}/-A_{1R}$. The signal processing method used in the system may have general application.

3 Claims, 3 Drawing Sheets

SIGNAL PROCESSING AND RADIO RANGING SYSTEM

This is a continuation of application Ser. No. 07/020,198, filed Feb. 27, 1987, which was abandoned upon the filing hereof, which was a continuation of Ser. No. 06/786,527 filed Oct. 11, 1985, abandoned.

BACKGROUND OF THE INVENTION

This invention relates generally to the processing of a group of electrical component signals to detect and/or locate a signal envelope of which the component signals form respective portions. This invention also relates to a radio ranging system wherein the above signal processing is used.

Various kinds of radio ranging systems are known. By way of example, U.S. Pat. No. 4,232,315 discloses a system particularly designed for detecting a predetermined slant range from a missile to the ground with a view to then initiating some desired control action on board the missile, this being a somewhat similar application to that for which the system to be described herein is intended.

SUMMARY OF THE INVENTION

No particular problem has been identified with the prior art systems—each may be useful in a particular context. Thus an object of the invention is to provide an alternative form of system and signal processing technique which may be useful in certain contexts.

According to one aspect of the invention, there is provided a method of processing a group of channel signals $X_1$ to $X_N$ to sense the location of a ripple envelope defined by the relative signal amplitudes, the method comprising the steps of forming using a filter the real and imaginary components $A_{1R}$ and $A_{1I}$, respectively, of the $A_1$ transform of a discrete Fourier transform:

$$A_r = \sum_{n=1}^{N} X_n e^{-j2\pi(n-1)r/N}$$

and then forming a location indicative signal by calculating the arctangent of $A_{1I}/-A_{1R}$.

According to a second aspect of the invention, there is provided a radio ranging system comprising a bark of N contiguous range gates and a filter for receiving the range gate outputs $X_1$ to $X_N$ and for forming a range indicative signal by calculating the real and imaginary components $A_{1R}$ and $A_{1I}$, respectively, of the $A_1$ transform of a discrete Fourier transform:

$$A_r = \sum_{n=1}^{N} X_n \cdot e^{-j2\pi(n-1)r/N}$$

and then calculating the arctangent of $A_{1I}/-A_{1R}$.

BRIEF DESCRIPTION OF THE DRAWINGS

In the accompanying drawings, which are given by way of example.

DETAILED DESCRIPTION OF THE PREFERRED EMBODIMENT

Figure 1:
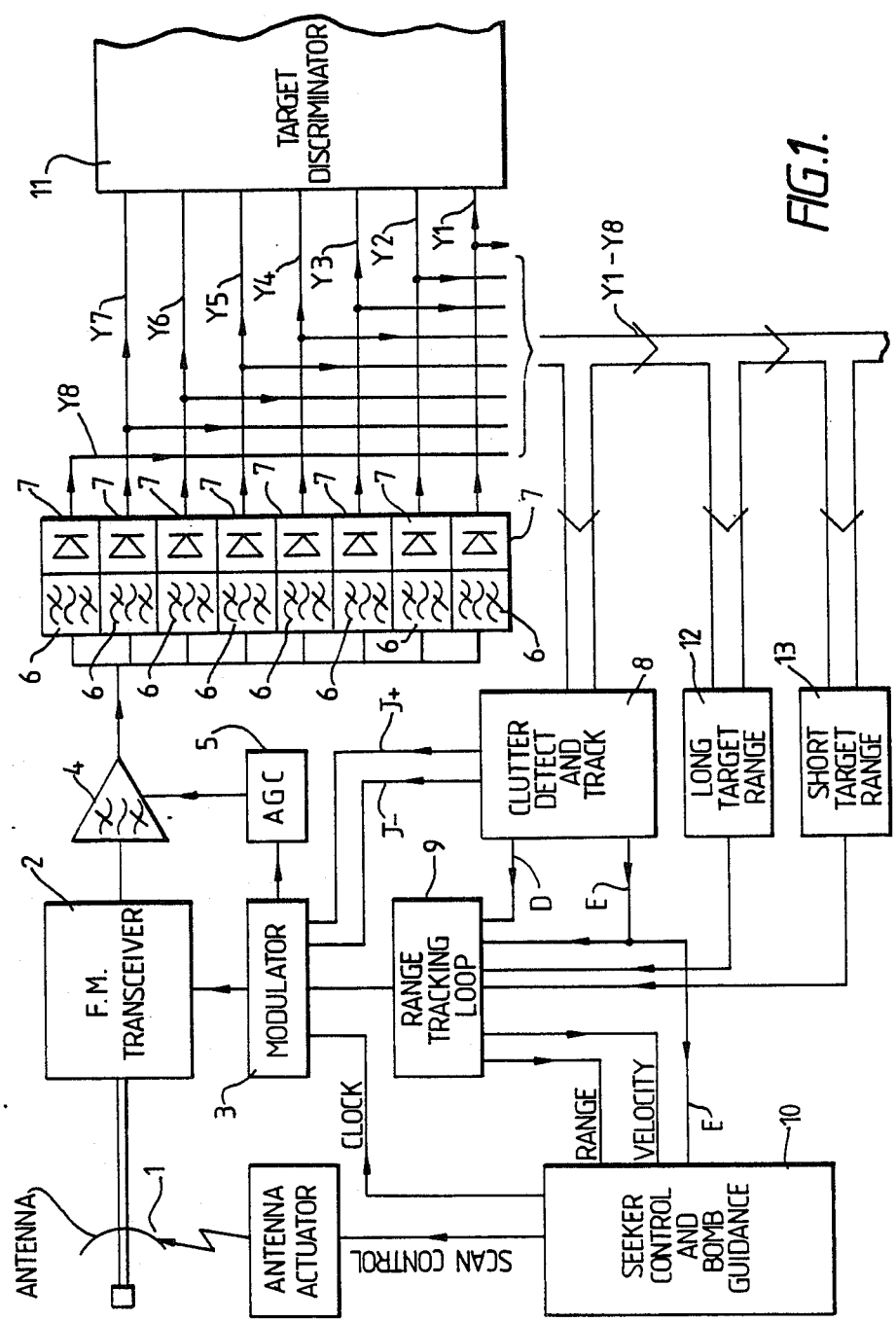
FIG. 1 is a block diagram of part of a seeker system for use on a terminally guided mortar bomb.

The system shown in FIG. 1 is for a terminally guided mortar bomb which, at a predetermined nominal slant range, is to control its roll rate and dive angle prior to entering a target search phase. The part of the system which is used in this pre-search orientation phase is to be described below. The pre-search orientation phase is carried out by using the target seeker of the bomb to detect and then track ground clutter returns.

The system of the invention comprises a linear frequency modulated continuous wave (FM-CW) radar seeker including an antenna 1 driven by a homodyne transceiver 2, of which the output frequency is modulated by modulator drive 3. In the transceiver 2, the return signal is mixed with a local oscillator signal to form an IF signal which is fed out to IF amplifier 4. Amplifier 4 is gain controlled by AGC circuit 5, the AGC circuit being also used to achieve inter-frequency-sweep blanking under the control of a blanking signal from modulator drive 3. The IF signal from amplifier 4 is passed to each of a bank of eight range gates, each comprising a band-pass filter 6 and a detector 7. The outputs Y1 to Y8 from the range gates are passed to a clutter detection and range discriminating sub-system 8 which produces a clutter detection signal D and a range error signal E, these signals being passed to a range tracking control loop circuit 9 which, in turn, phase-controls the modulation signal generated by modulator drive 3 and forms range and range-rate (velocity) signals for use by a seeker controller and bomb guidance sub-system 10. Signal E may also be fed to sub-system 10 as shown in FIG. 1.

For use during the target search phase, the system also comprises a target discriminator sub-system 11 which makes use of range gate outputs Y1 to Y7 and long and short range target ranging sub-systems 12 and 13 which each receive outputs Y1 to Y8 and which, in response to appropriate control signals from sub-system 10, take over the range measuring function using, for this purpose, the same control loop circuit 9. The function and design of sub-systems 10 to 13 and of circuit 9 will be set by the particular requirements of the application and will be within the scope of those skilled in the art. However, the invention is concerned with the system up to the production of signals D and E. Although within this area of the system, the construction of transceiver 2, amplifier 4 and AGC circuit 5 may be conventional and will not be described in detail.

Figure 2:
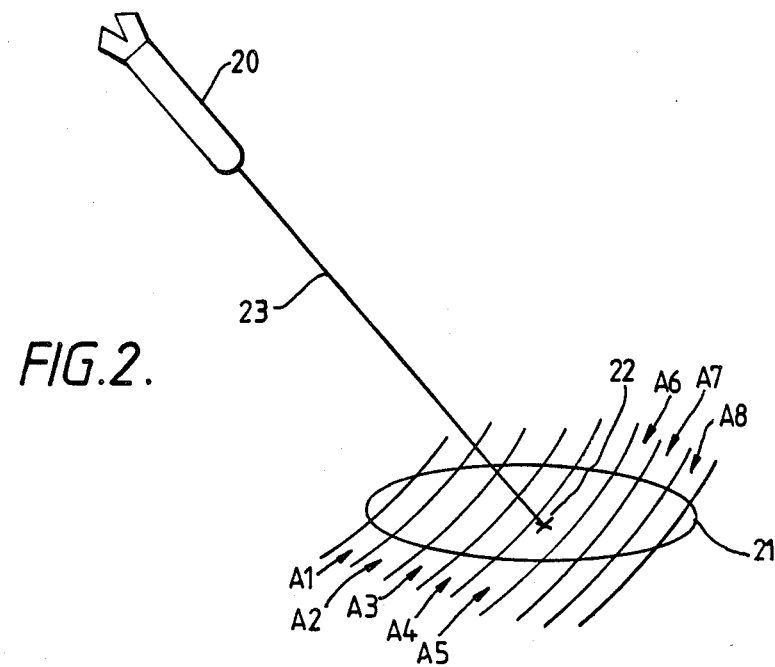
FIG. 2 is a sketch showing the bomb approaching the ground.
Figure 3:
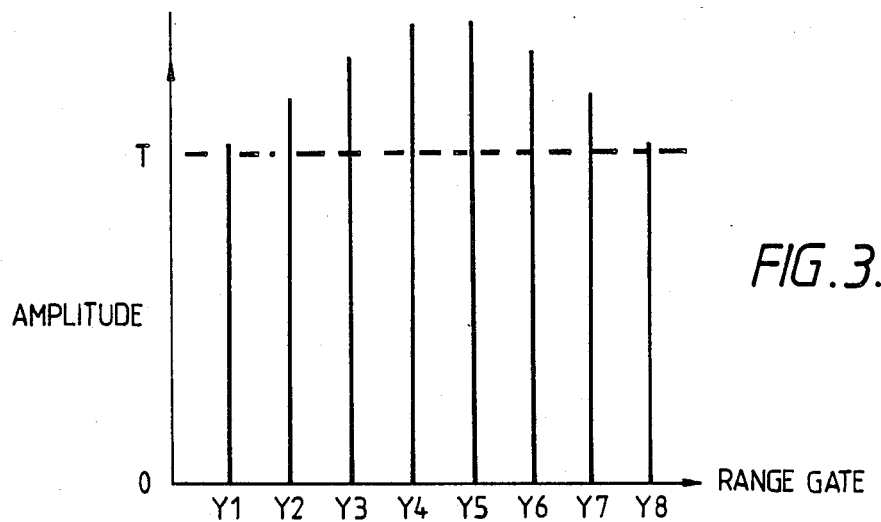
FIG. 3 is a diagram showing the relationship between the outputs of a series range gates used in the FIG. 1 system.

FIG. 2 shows the bomb 20 approaching the ground with its seeker antenna forwardly directed so that the transmission beam therefrom illuminates area 21 centered on the point of intersection 22 between the beam axis 23 and the ground. Provided the drive signal from modulation drive 3 is correctly phased for the particular slant range of the bomb, the signals Y1 to Y8 represent clutter returns from respective ones of the areas A1 to A8 defined by the arcuate range gate boundaries 24. In addition, the transmission pattern of the seeker antenna is such that the strength of the clutter return is greatest from a ground portion at the intersection point 22 and decreases with increasing distance from that point. Thus, for a particular depression angle (say 50°) of the beam axis (which corresponds to the dive angle of the bomb when the seeker antenna is forwardly directed) the outputs Y1 to Y8 may be as shown in FIG. 3, ie, with relative amplitudes which define a signal envelope having a maxima around the position of outputs Y4 and Y5. Each signal comprises quite a large thermal noise bias T with the clutter component sitting on top. For a smaller depression angle, say 30°, the clutter components of the outputs to each side of Y4 and Y5 will be greater, ie, the envelope will be wider and flatter, while for a greater depression angle, say 70°, the clutter component may be virtually zero on each side of Y4 and Y5.

Initially, of course, no clutter component will be received—one function of sub-system 8 is to detect when it is being received and then produce signal D which indicates this to circuit 9. Then, when the clutter component is received, for a given phase of the modulation signal from modulator drive 3, the maxima of the signal envelope will move through the range gates as the slant range changes. Signal E produced by sub-system 8 is indicative of the offset from a chosen mid-range of one of the range gate outputs Y1 to Y8 of the envelope maxima and it acts, via loop circuit 9, to so vary the modulation signal phase that the maxima is maintained within the chosen range gate. In the present case, the chosen range gate is that which produces output Y4—this is convenient because it is the centre one of the outputs Y1 to Y7 made use of by target discriminator sub-system 11.

Figure 4:
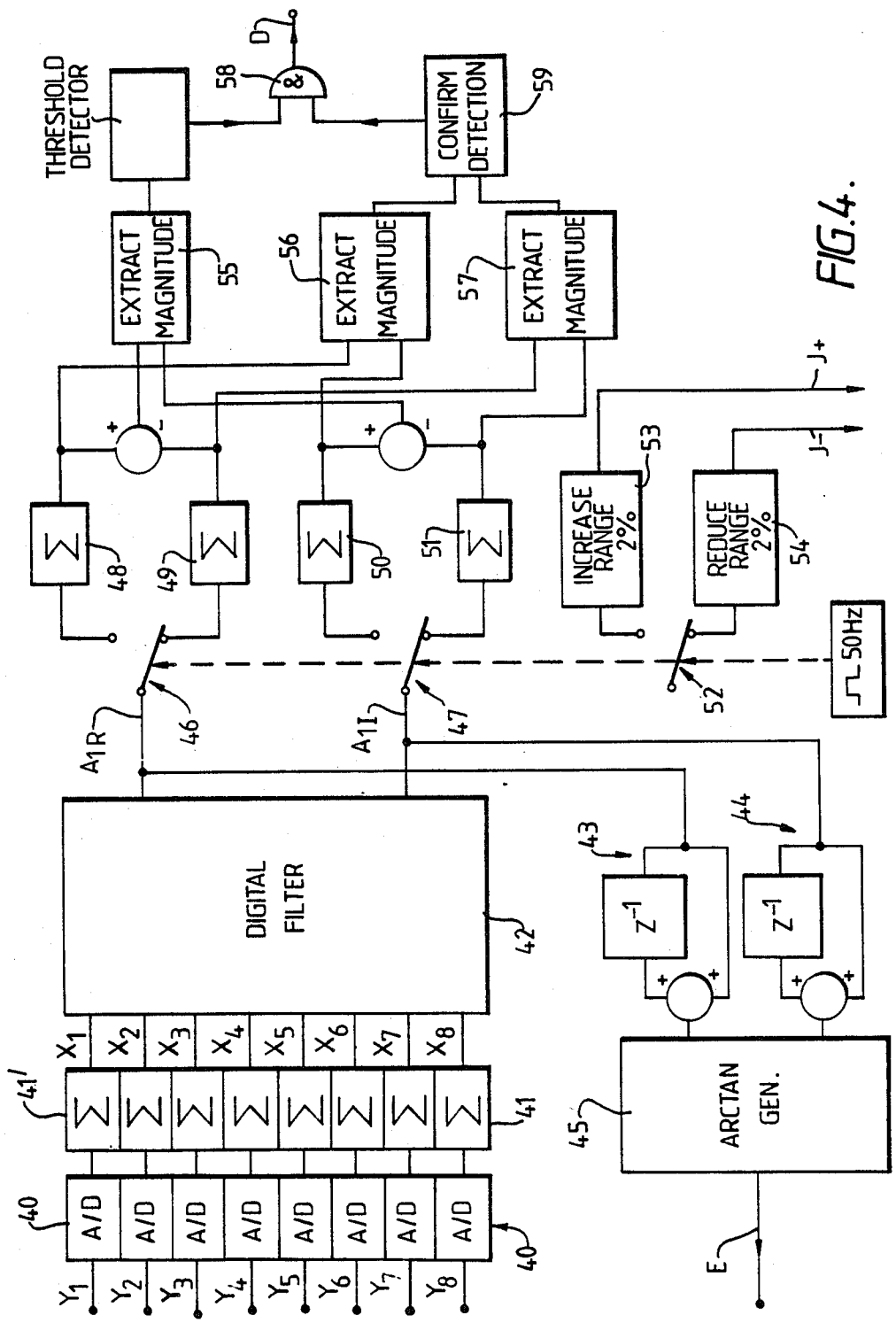
FIG. 4 is a simplified circuit diagram of a clutter detection and range discriminating sub-system used in the FIG. 1 system.

As shown in FIG. 4, the outputs Y1 to Y8 are received by a series of analog-to-digital converters 40 within the sub-system 8, which converters produce digitised samples of the outputs at a rate of say 20 KHz. The sample values are summed in respective accumulators 41, and the summed values are dumped, say at a 500 Hz rate, to the inputs of a digital filter 42. The digital signals X1 to X8 so received by filter 42 still contain the original noise bias T and this has to be discriminated from the clutter component envelope. To do this, the clutter envelope is regarded as a sinusoidal ripple above the noise whereupon the sum of the products of each signal X1 to X8 and a complex exponential having periodicity in the range dimension are equal to the coverage of the eight range gates, ie, equal to the sum:

$$\sum_{n=1}^{8} X_n \cdot e^{-j2\pi(n-1)/8}$$

(wherein $X_n$ is the output of the nth range gate). This equation results in a complex number which is independent of the bias level and of which the magnitude is dependent on the amplitude of the ripple across the range filters. The phase of the complex number varies over almost $2\pi$ radians between offsets of the clutter envelope peak from the centre of the bank of range gates while, near the centre, the phase varies linearly with offset at $\pi/4$ radians per range gate with very little sensitivity to the clutter to noise ratio in the range gates. The required complex number may be extracted by a discrete Fourier transform (DFT)

$$A_r = \sum_{n=1}^{8} X_n \cdot e^{-j2\pi(n-1)r/8}$$

It has been found that a single cycle of a sinusoid is a reasonable approximation across the bank of range gates within the limits of the design. Therefore, calculation of the $A_1$ transform, rather than the complete DFT, provides sufficient information.

The real and imaginary components of this transform can be calculated as:

$$A_{1R} = X_1 - X_5 + 1/\sqrt{2}\,(X_2 - X_4 - X_6 + X_8)$$

$$A_{1I} = X_3 + X_7 - 1/\sqrt{2}\,(X_2 + X_4 - X_6 - X_8)$$

This calculation is performed by the digital filter 42. Instead of the exact multiplier value $1\sqrt{2}$, the filter can use the reasonably correct approximation $\frac{3}{4}$. To produce the signal E, the signals $A_{1R}$ and $A_{1I}$ from digital filter 42 are first smoothed by respective moving window filters 43 and 44 to reduce the bandwidth as much as possible before the signals are fed to arctangent generating device 45 which carries out a non-linear arctan operation:

$$E = 4/\pi \tan^{-1}(A_{1I}/-A_{1R}) + 1 \text{ range gates}$$

For ease of digital implementation, the arctan operation is carried out with a resolution of $\pi/8$ (half a range gate), the quantization resulting from this being normally small compared with system noise. The term $+1$ in the operation, ie, the offset of one range gate, is to put the discriminator cross-over point in the fourth gate (Y4) for the reason described earlier.

The construction of filter 42 and device 45 will be clear to those skilled in the art—each could comprise an appropriately programmed microprocessor or based computer system for example.

To produce signal D, the signals $A_{1R}$ and $A_{1I}$ are passed via respective ganged changeover switches 46 and 47 each to one of two accumulators 48 or 49 and 50 or 51. Prior to detection of the ground clutter, interference may be received which generates a clutter-like envelope of the range gate outputs. To reduce the change of a false clutter detection, the phase of the modulation drive signal from modulator 3 in FIG. 1 is jittered by a 50 Hz square wave applied to a changeover switch 52 which acts via plus and minus 2% range biasing signal generators 53 and 54, respectively, to appropriately phase control modulator 3 with signals J+ and J−. Switch 52 is ganged with switches 46 and 47. The $A_{1R}$ and $A_{1I}$ samples taken during the higher range jitter states thus are summed in accumulators 48 and 50, respectively, while the samples produced during the lower range jitter states are summed in accumulator 49 and 51. The summed values are dumped from the accumulators 48 to 51 once every 64 milliseconds to three magnitude extractors 55, 56 and 57. Each extractor receives a real value and an imaginary value and forms the resultant thereof. Extractor 55 receives as its real value the difference between the values dumped from accumulators 48 and 49 and, as its imaginary value, the difference between the values dumped from accumulators 50 and 51. The resultant is then compared with a threshold value and, if greater than the threshold, a signal is passed to one input of AND gate 58. Extractor 56 receives as its real and imaginary values the values dumped from accumulators 48 and 50, while extractor 57 receives the values dumped from accumulators 49 and 51.

The jittering of the modulation drive signal will cause the vector signal representative of a true clutter return with its centroid close to the desired nominal search range to rotate through some constant angle. Meanwhile, any sensed vector which is due to channel imbalance will be unaltered. By supplying extractor 55 with the differences between the values summed in accumulators 48 and 49 and accumulators 50 and 51, the wanted signal components are effectively added while various imbalance components are subtracted. This gives some immunity to false alarms. In addition, further false alarm protection is provided by extractors 56 and 57. A short burst of interference will probably only coincide with a single jitter state while a spurious clutter return from well beyond the intended search range will be much stronger in one jitter state than the other. Device 59 senses these error states by testing to ensure that the ratio between the vector magnitudes from extractors 56 and 57 are below a preset limit. If not, an error state has occurred. Otherwise, the device 59 provides an enabling signal to the other input of gate 58.

Although the system described is an FMOW system, and consequently, each range gate comprises a bandpass filter 5, the invention could also be applied to a pulse radar system with the filters 6 replaced by suitable time gates.

As mentioned earlier, filter 42 and device 45 could be implemented as respective microprocessor systems. Preferably, however, all of what is shown in FIG. 4, ie, the filter 42, moving window filters, arctan generator, and the parts which produce signal D are implemented by a single computer system which may be microprocessor based. Then, of course, the various items shown in the figure represent, not items of hardware, but functions of the software programmed into the computer system. The design of suitable software will be within the scope of those skilled in the art.

It would also be possible, of course, to replace the various items of FIG. 4 with appropriate analog items.

What is claimed is:

1. A method of radio ranging comprising the steps of:
   receiving a radar return signal;
   discriminating the radar return signal to form a plurality N of range channel signals $X_1$ to $X_N$ representative of return signal components associated with respective ones of N consecutive range cells; and
   determining the location of the centroid of a peak in the ripple envelope defined by the range channel signals by filtering those signals to form the real and imaginary components $A_{1R}$ and $A_{1I}$, respectively, of the $A_1$ transform of a discrete Fourier transform:

$$A_r = \sum_{n=1}^{N} X_n e^{-j2\pi(n-1)r/N}$$

and then calculating a range error signal from the arctangent of $A_{1I}/-A_{1R}$.

2. A radio ranging system comprising;
   receiver means for receiving a radar return signal;
   discriminating means connected to the receiver means for discriminating the radar return signal to form a plurality N of range channel signals $X_1$ to $X_N$ representative of components of said return signal associated with respective ones of N consecutive range cells;
   filter means connected to the discriminating means for forming respective signals representative of the real and imaginary components $A_{1R}$ and $A_{1I}$, respectively, of the $A_1$ transform of a discrete Fourier transform:

$$A_r = \sum_{n=1}^{N} X_n e^{-j2\pi(n-1)r/N}$$

and calculating means connected to the filter means for calculating a range error signal from the arctangent of $A_{1I}/-A_{1R}$ so as to determine the location of the centroid of a peak in the envelope defined by the range channel signals.

3. A radio ranging system for use on board an airborne weapon to determine the slant range from the weapon to the ground, the system comprising:
   radar means for illuminating the ground and for receiving clutter returns from the ground;
   range gate means connected to the radar means for discriminating the clutter returns to form a plurality N of range channel signals $X_1$ to $X_N$ representative of clutter returns received from within respective ones of N range cells; and
   centroid locating means connected to the range gate means for determining the location of the centroid of a peak in the ripple envelope defined by the range channel signals, said centroid locating means comprising filter means for forming respective signals $A_{1R}$ and $A_{1I}$, respectively, of the $A_1$ transform of a discrete Fourier transform:

$$A_r = \sum_{n=1}^{N} X_n e^{-j2\pi(n-1)r/N}$$

and calculating means connected to the filter means for determining a range error signal from the arctangent of $A_{1I}/-A_{1R}$.

* * * * *